(12) United States Patent
Luciani

(10) Patent No.: US 6,505,114 B2
(45) Date of Patent: Jan. 7, 2003

(54) TRAFFIC MONITORING SYSTEM AND METHOD

(76) Inventor: Sergio Luciani, 7911 12$^{th}$ Fairway La., US-Humble, TX (US) 77325

( * ) Notice: Subject to any disclaimer, the term of this patent is extended or adjusted under 35 U.S.C. 154(b) by 0 days.

(21) Appl. No.: 09/784,038

(22) Filed: Feb. 16, 2001

(65) Prior Publication Data

US 2002/0107634 A1 Aug. 8, 2002

(30) Foreign Application Priority Data

Feb. 6, 2001 (SE) .............................................. 0100351

(51) Int. Cl.$^7$ ................................................. G08G 1/09
(52) U.S. Cl. ..................................... 701/117; 701/207
(58) Field of Search ................................ 701/117, 207, 701/209, 119, 300; 455/456, 457; 340/990, 993, 995

(56) References Cited

U.S. PATENT DOCUMENTS

| | | | |
|---|---|---|---|
| 3,582,620 A | | 6/1971 | Noetinger |
| 3,626,413 A | | 12/1971 | Zachmann |
| 4,866,438 A | | 9/1989 | Knisch |
| 4,985,705 A | | 1/1991 | Stammler |
| 5,289,183 A | * | 2/1994 | Hassett et al. ............... 340/905 |
| 5,337,082 A | | 8/1994 | Fredericks |
| 5,465,289 A | | 11/1995 | Kennedy, Jr. |
| 5,610,821 A | | 3/1997 | Gazis et al. |
| 5,663,720 A | | 9/1997 | Weissman |
| 5,696,502 A | * | 12/1997 | Busch et al. ................. 340/905 |
| 5,745,865 A | | 4/1998 | Rostoker et al. |
| 5,822,712 A | * | 10/1998 | Olsson ......................... 340/934 |
| 6,011,515 A | * | 1/2000 | Radcliffe et al. ........... 340/936 |
| 6,119,013 A | * | 9/2000 | Maloney et al. ............ 455/456 |
| 6,150,961 A | | 11/2000 | Alewine et al. |
| 6,292,742 B1 | * | 9/2001 | Heimann et al. ........... 701/117 |

FOREIGN PATENT DOCUMENTS

| | | |
|---|---|---|
| WO | WO 98/12683 | 3/1998 |
| WO | WO 99/44183 | 9/1999 |
| WO | WO 01/01367 | 1/2002 |

OTHER PUBLICATIONS

Japanese Patent Abstract; JP 10307993A; Nov. 17, 1998.
ITE 1994 Compendium of Technical Papers, pp. 255–259, "Capital IVHS Operational Test", Robinson et al.

* cited by examiner

*Primary Examiner*—Michael J. Zanelli
(74) *Attorney, Agent, or Firm*—Birch, Stewart, Kolasch & Birch, LLP

(57) ABSTRACT

A method and system for traffic monitoring and prediction of traffic intensity. The method comprises the steps of determining at least twice, within a specified time interval, geographical positions of a plurality of mobile devices in a mobile telecommunications network. This is done by means of measuring at least one property of signals transmitted between the mobile devices and base stations in the mobile telecommunications network. At least a subset of the geographical positions are compared with a route of a road provided in a route database in order to identify mobile devices having routes corresponding to at least a part of the road route. A velocity for the identified mobile devices based on the at least two positions, and the calculated velocity of at least one identified mobile device is compared with a reference velocity of the road in order to predict traffic intensity on the road. A system for short range monitoring is also provided.

15 Claims, 3 Drawing Sheets

TRAFFIC MONITORING SYSTEM AND METHOD

FIELD OF THE INVENTION

The present invention relates in general to a method and a system for traffic monitoring and in particular to measuring traffic intensity and congestion on roads.

BACKGROUND OF THE INVENTION

During the latter part of the twentieth century with the expansion of metropolitan areas and the development of new suburban housing, society has experienced longer commuting times to work and higher vehicular congestion on the major metropolitan thoroughfares. National highway systems developed in the early part of the century have not fared any better. The unprecedented growth in vehicle ownership, coupled with public transportation and the high rate of commerce using trucking services has caused substantial congestion as well in almost all major arteries of communication. Traffic and congestion are undesirable, as they are the cause of increased pollution, additional costs to society and in many instances they contribute to accidents.

Various approaches to traffic monitoring and control are being implemented on a world-wide basis. Most of these systems employ sensors that are inherently limited in the coverage area and therefore such systems in most instances are deployed in limited critical areas and depend heavily on cameras and basic weather sensors. Vehicles are then alerted or redirected as needed via large luminous signs posted on such roadways. While these methods are improving the overall safety of some areas they do not provide a comprehensive solution to the problem of traffic and vehicular congestion monitoring. Systems that depend electronic monitoring embedded in the roadway, require a large number of sensors with the associated large investment required and in addition such solutions require constant and costly maintenance.

Radar technology is often used as means of monitoring traffic, notably air traffic. Several methods use microwave raster beams generated by a roadside sensor as disclosed in U.S. Pat. No. 3,582,620 to Noetinger; U.S. Pat. No. 3,626,413 to Zachmann; U.S. Pat. No. 4,866,438 to Knish; U.S. Pat. No. 4,985,705 to Stammler; U.S. Pat. No. 5,337,082 to Fredericks and U.S. Pat. No. 5,663,720 to Weissman. These solutions make use of radar signals. Such approaches provide more or less weather interference-free monitoring, but are mainly local solutions, which result in large investments and high maintenance costs and limit them to monitor specific areas.

Optimal routing and automated traffic mapping using a wireless network has also been used as means of gathering and interpreting information aimed at mapping traffic conditions, and is disclosed in for example U.S. Pat. No. 6,150,961 to Alewine et al; U.S. Pat. No. 5,610,821 to Gazis et al; U.S. Pat. No. 5,745,865 to Rostoker et al; JP 8221697 to Takeda Mutsuya; and JP 10307993A to Maru Shinichi. These approaches are focused on controlling traffic and routing and require dedicated communication between the mobile units and the system aimed at the acquisition of information necessary to operate such systems. The solution in U.S. Pat. No. 6,150,961 to Alewine at al requires in addition that vehicles must be equipped with a GPS unit. While such systems may provide solutions for specific applications such as providing optimal routing for an ambulance, the nature of the information acquisition is such that a generalized mapping system would require agreement by a large number of vehicles equipped with wireless units to regularly provide such information. Such agreements are likely to be expensive to implement and more likely not possible to implement in a homogeneous manner over different areas, which negate the ability to generate large area mapping information. In U.S. Pat. No. 6,150,961, the use of wireless infrastructure to provide feedback from GPS units is specifically considered, which could generate location and therefore velocity data from moving vehicles, again communication between the vehicles and the data acquisition system is obtained to communication dedicated to this specific end. Such approach would prove often impractical to implement. In addition, it would be necessary to have installation of such units in a sufficiently large number of vehicles to generate meaningful data, which would, in any case, limit the acquisition of data to areas where the units are outfitted and circulate at any point in time.

OBJECTS OF THE INVENTION

It is therefore an object of the present invention to provide a method and system for traffic monitoring which is not limited to usage of dedicated devices located in a selection of vehicles, overcoming the above-mentioned problems.

The objects are achieved by the methods and systems according to the appended claims.

SUMMARY OF THE INVENTION

According to the invention, a method for traffic monitoring comprises the steps of: determining at least twice, within a specified time interval, geographical positions of a plurality of mobile devices in a mobile telecommunications network by means of measuring at least one property of signals transmitted between said mobile devices and base stations in said mobile telecommunications network; comparing at least a subset of said geographical positions with a route of a road provided in a route database in order to identify mobile devices having routes corresponding to at least a part of said road route; calculating a velocity for said identified mobile devices based on said at least two positions; and comparing said calculated velocity of at least one identified mobile device with a reference velocity of said road in order to monitor and predict traffic intensity on said road.

Hereby a method is provided which makes traffic monitoring of almost any road having coverage of a mobile telecommunications network feasible. The inventive method takes advantage of the large amount of users of mobile devices, such as mobile phones or other wireless devices in a telecommunications network, and the signals that are transmitted between these devices and a plurality of base stations with known locations. The locations of the base stations tend to follow transit arteries, such as highways, where conversations and usage of wireless services is likely to take place. Further, many mobile devices are located in vehicles, such as cars, trucks, buses, etc, or carried by persons located in such vehicles. Analyzing these signals in conjunction with the information where base stations are located in relation to roads and highways, it becomes possible to monitor the traffic on virtually any road covered by a mobile telecommunications network. The invention will benefit from the higher potential frequency reuse in third generation mobile telecommunication systems coupled with capacity requirements for new wireless applications, which will result in further increase in the density of base stations in urban areas and highly trafficked thoroughfares further enhancing the data-gathering ability of the proposed method.

Basically, there are two techniques for positioning a mobile device using a mobile telecommunications network, terminal based or network based. Network based solutions do not require a special kind of handset which would imply that all radio signals to and the wireless network could be used to compute traffic patterns. The present invention particularly benefits from the network based positioning, which eliminates specialized software in the mobile devices. Examples of network based solutions include the Cell Global Identity and Timing Advance (CGI+TA) and the Uplink Time of Arrival (UL-TOA) methods. Furthermore, Doppler Shift from the radio signal of a mobile device can be used to estimate location and speed of vehicles. With the advent of GPRS technology in second generation wireless networks and the resulting "always on" conditions for the wireless users, the data flow to the network will be substantially increased. Third generation (3G) systems will further enhance these characteristics.

Then, the positions of a mobile device is compared with information about road routes and their geographical relationship with the base stations. The positions of base stations are in general known, and these positions could either be stored in the road route database or provided with the information about the position of a specific mobile device. Given at least two, and preferably more, locations of a mobile device, it becomes possible to compare these with the route of a road. If they all fit along the route, or at least a part of a route, and it is possible to determine whether the mobile device possibly could be travelling along the road based on this information, the data about the mobile phone and its movements could be further analyzed.

In order to predict the traffic intensity on a road, information about the velocities of the mobile devices that are travelling along the route of the road is used. For example, the highest measured velocity could be compared with a reference velocity. Instead of using the highest obtained velocity, an average of a group of high velocities can be used for comparing with a reference velocity for a road. The reference velocity could be the maximum allowed speed, the highest historical measured speed, a speed which is typical for that time of the day, etc. Then, if the traffic travels at for instance 30% of the reference speed, the road is probably congested and the traffic is intense. Thus, the invention uses the vehicles' speeds in relation to a reference speed as a measure of how intense the traffic is. In another embodiment, the number of vehicles passing a section of a road per time unit could be a measurement of how intense the traffic is.

Preferably, some sort of filtering is performed to remove those mobile devices, which move along the route of a road, but cannot be assumed to be located in a vehicle, for example carried by a pedestrian or a cyclist. This could be-done by excluding those measurements which relate to mobile devices having a velocity below a certain limit, for example 20 km/h.

To enhance measurement accuracy, prior measurement readings could be used in the specific areas of interest to filter relevant data and further enhance the accuracy of location-specific readings.

With the invention it becomes possible to provide a graphical map of both current and historical traffic conditions, which could be used by individuals, companies or institutions, to determine optimal vehicular routing. The traffic intensity could then be represented by colors describing the level of intensity.

According to the invention a system for traffic monitoring, comprises: positioning means for determining at least twice, within a specified time interval, geographical positions of a plurality of mobile devices in a mobile telecommunications network by means of measuring at least one property of signals transmitted between said mobile devices and base stations in said mobile telecommunications network; means for comparing at least a subset of said geographical positions with a route of a road provided in a route database in order to identify mobile devices having routes corresponding to at least a part of said road route; means for calculating a velocity for said identified mobile devices based on said at least two positions; and means for comparing said calculated velocity of at least one identified mobile device with a reference velocity of said road in order to predict traffic intensity on said road.

Hereby a system is provided overcoming the above-mentioned problems. The system has essentially the same advantages as the inventive method described above.

Also according to the invention, a solution is provided for traffic monitoring where the above-mentioned method and/or system is not feasible, which also takes advantage of existing infrastructure. This is accomplished by a system for traffic monitoring of a road comprising: at least one fixed transceiver located near said road having a coverage area covering essentially the full width of said road, being adapted to communicate with a transceiver located in a vehicle moving on said road; means for measuring the time difference between establishing of contact and loss of contact with a transceiver moving through said coverage area; means for calculating a velocity of said moving transceiver based on said time difference and information about said coverage area; and means for comparing a calculated velocity of at least one moving transceiver with a reference velocity of said road in order to predict traffic intensity on said road.

Such a system makes it possible like the above-mentioned method and system to utilize existing infrastructure in society. Preferably, the fixed transceiver and the moving transceiver are units using BLUETOOTH™ wireless technology, or at least working according to the same principles as defined by the BLUETOOTH™ standard.

The automotive industry is in the process of incorporating BLUETOOTH™ technology in nearly all vehicles. We can expect in the very near future that such modules will be placed in all produced vehicles. As a part of the general agreement for BLUETOOTH™ standard, it is contemplated that each BLUETOOTH™ unit has a unique identity. Equipment enabled with BLUETOOTH™ technology will automatically search the vicinity for other BLUETOOTH™ compliant equipment. On contact, information is exchanged allowing the system to determine weather or not to establish a more specific connection. At this first encounter the BLUETOOTH™ devices transmit a personal identification number. Up to eight devices can operate simultaneously within a BLUETOOTH™ cell. Hence in areas where the wireless network cannot provide proper data flow, BLUETOOTH™ modules are installed in the vicinity of the monitoring areas and these units monitor vehicles equipped with BLUETOOTH™ modules and provide the required data to the system.

Then, the system uses a trimmed signal amplifier and/or directed antenna to only cover a specific part of a road. When a BLUETOOTH™ equipped vehicle then passes along the road which is covered by the range of this antenna, the time difference between making and loosing contact with the fixed BLUETOOTH™ module is measured. In advance, the distance between those positions along the road where the threshold is sufficiently high to obtain contact between a moving BLUETOOTH™ module is measured. This information now serves as a base for calculating the velocity of vehicles passing by. Then, intensity and congestion is determined by comparing the velocity of passing vehicles with a reference velocity. The analysis, filtering, etc of mobile device velocity is similar to the above-mentioned method.

Preferably, the coverage area of the fixed BLUETOOTH™ unit is a substantially rectangular shaped band substantially perpendicular to the direction of said road provided by an directed antenna.

Preferably, the system comprises two fixed BLUETOOTH™ units located between the lanes of opposite directions having their antennas directed towards respective roadside.

BRIEF DESCRIPTION OF THE DRAWINGS

For exemplifying purposes, the invention will be described to embodiments thereof illustrated in the attached drawings, wherein.

DESCRIPTION OF A PREFERRED EMBODIMENT UTILIZING A TELECOMMUNICATION NETWORK

Figure 1:
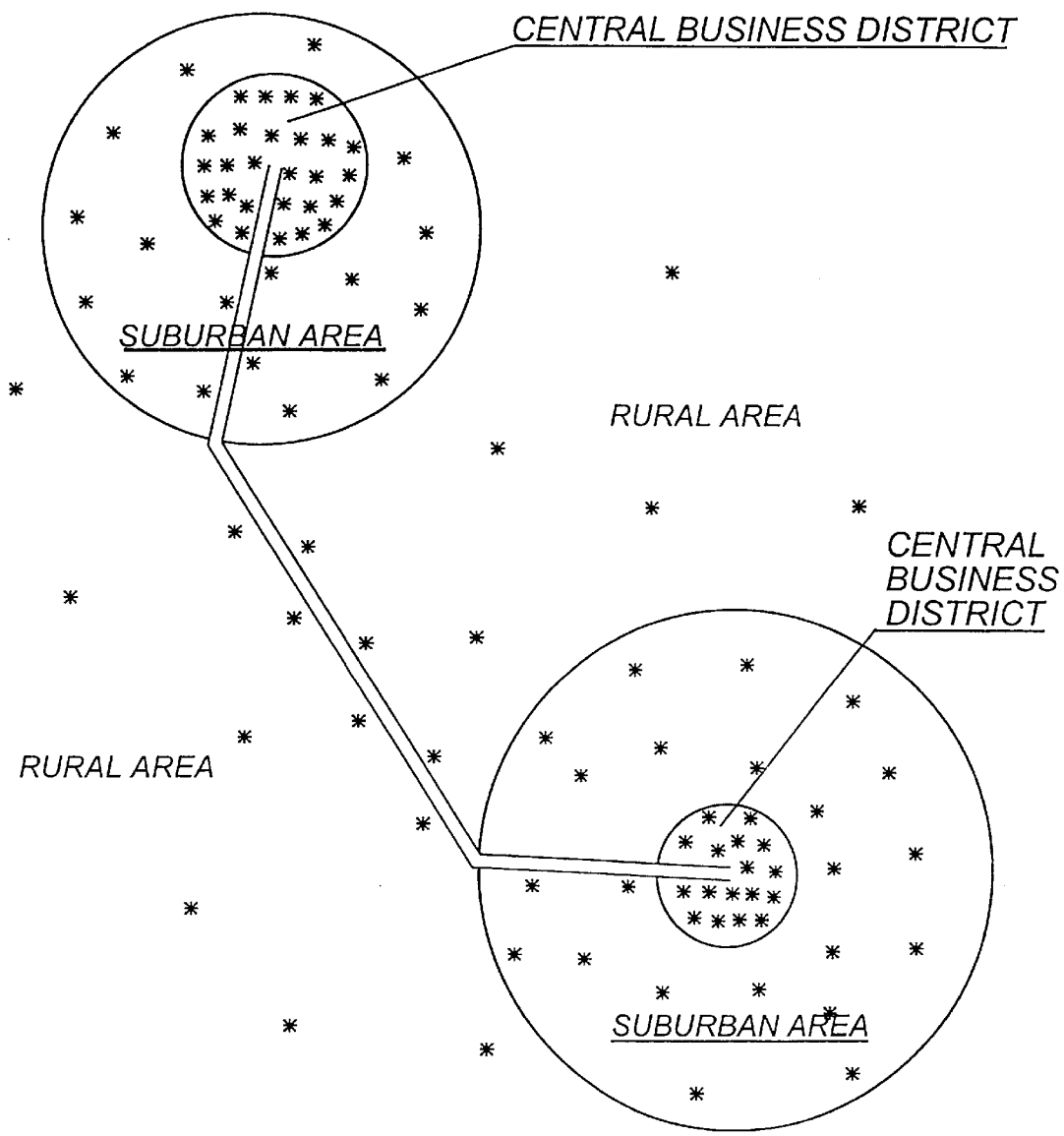
FIG. 1 is a schematic view of a typical deployment of base stations in a wireless network as they relate to demographics and roadways.

The proposed traffic monitoring system could conceivably cover all areas where a mobile telecommunications network is deployed. To the extent that vehicular traffic is more likely to be heavy in critical thoroughfares, these areas are of particular interest, and will receive more data as more vehicles will be present, and more likely to engage in conversations (or simply carry wireless phones). In general, the usage of mobile devices in an area reflects the number of base stations located that area, which is illustrated in FIG. 1.

Figure 2:
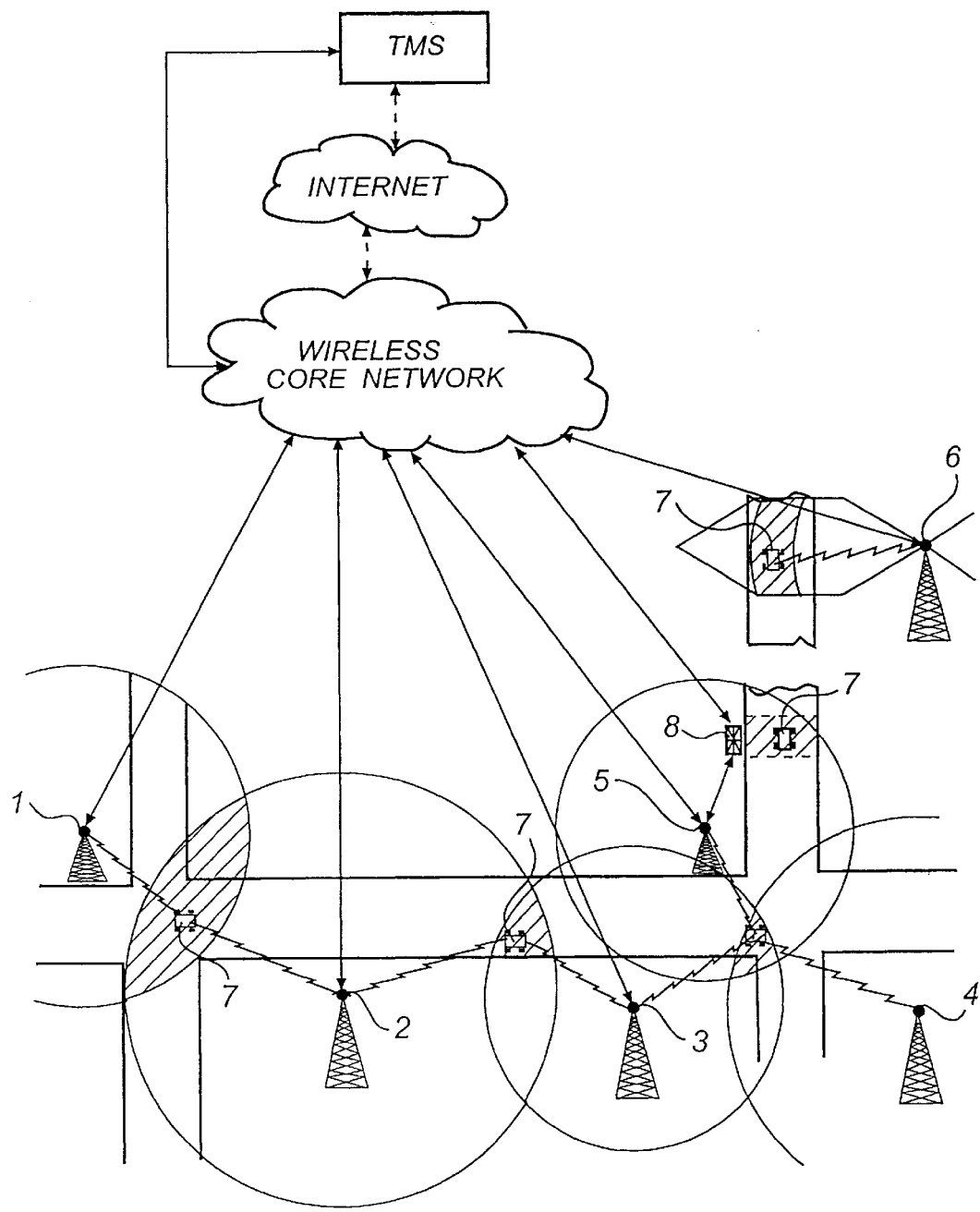
FIG. 2 is a schematic view of a traffic monitoring system utilizing a mobile telecommunications network in its operating environment.

Referring to FIG. 2, it is conceivable that different techniques could be used for positioning a mobile device at different locations as these locations may even belong to different operators or be of different types such as CDMA, GSM, etc. In addition, the telecommunications networks could use different technologies and therefore require different algorithms. This is illustrated in FIG. 2, wherein base stations 1 and 2 use Doppler Shift data to compute speed and location (i.e. direction) of an incoming vehicle 7 whose occupant is engaged in a conversation, base stations 3, 4 and 5 use Uplink Time of Arrival (UL-TOA) and Enhanced Observed Time Difference (E-OTD), while base station 6 uses enhanced Cell Global Identity and Single Cell Timing Advance (enhanced CGI+TA). For a unit 7 travelling from the coverage area of base station 1 to the coverage area of base station 2 to the coverage area-of base station 3, handover of signal from one base station to another could further be used to compute average speed for longer distances where communication with adjoining base stations occurs within one communication session. The data required for these computations is currently used to enable the wireless network to function properly (handover of signal management and frequency allocation for example). Preferably, data used for these purposes removes the unit ID to ensure privacy.

Once the data is acquired, it is transferred from the base stations to a mobile station switching center, thus it is transferred from the radio access network to the core network. Such data could be in the form of basic data needed to compute location, speed and direction or these computations could be performed at the wireless network level. Raw data or calculated speed and vehicle location data is further forwarded to a central unit, called Traffic Monitoring Server (TMS), via the Internet for example, or via a dedicated data line from the wireless core network. If such values are not available from the wireless network, location, speed and direction of the vehicles could then be calculated from raw data at the TMS. The location of the Traffic Location Server could be either at the core network location or at a higher level receiving information from the wireless network. Possibly, filtering for data relevance could be done at the base-station level.

In the TMS, a database comprising information about road routes and location of base stations is provided. In the TMS, the positions obtained for a mobile device describing a movement are compared with the route of a road. There are several techniques known in the art for correlating a mobile device movement to a road route, one is for example to analyze how:many positions that fit or touch the path of a road. If all of the positions match at least a part of a road, the mobile device probably travels along that road.

The traffic intensity is then determined by comparing the speed of vehicles with a reference speed for a given road. At low vehicle speeds, such as between 10 and 20 Km/h, some confusion may arise between a vehicle and a wireless unit carried by a person while walking. But, on a major thoroughfare, all traffic under for example 20 Km/h can be considered to be congested, while the likelihood of confusion between a terrestrially based is not trivial, given the amount of time allowed for computation of speed and location during periods when vehicles travel at low speeds, these errors can be minimized. Furthermore the choice of the highest computed speed and averaging of values over a certain time period, at any time interval and statistical historical data of average signal frequency should minimize these errors. In order to further minimize errors in computation of relevant signals, i.e. signals coming from units located on a thoroughfare versus signals coming from neighboring areas or from people walking in neighboring areas, to enhance the discrimination capabilities available to the application, test vehicles could be equipped with mobile devices, travel the relevant areas, and provide data such as signal strength, fading and any other measurement relevant to the computation of speed and location. This data would subsequently be used as a local benchmark, further refining the process of discrimination and streamlining the computational effort.

In another embodiment, an alternative to random harvesting of data as described above, an agreement be made with a network operator. All subscribers would then be encouraged to dial a number if they travel through a congested area, and provide data in exchange for a credit incentive. Further agreements in specific areas could be achieved with local transportation companies for example where specific vehicles would periodically broadcast to the wireless network.

The information about intensity and congestion could then be made available via the Internet for users or via a wireless network to mobile users. A number of applications could be based on the inventive method and system, for example digitized maps could be color coded and provided via a wireless interface such as a WAP server to wireless telephones and handheld computers. Such a digitized map could show roads in three main colors: green, yellow and red, to signify different states of congestion. The graphical user interface could provide the user with zoom capabilities to allow the users to view specific areas in more detail. Digitized maps with specific maximum speed achieved and a time/date stamp could be provided via the Internet to users requiring further detailed information. This service would provide the same capabilities but would also have a database with location, time and date speed data, to allow for planning of routing in a more comprehensive manner.

DESCRIPTION OF A PREFERRED EMBODIMENT UTILIZING BLUETOOTH™ MODULES

There are some areas that because of the location of base stations or because of radio signal interference problems, could not provide adequate data to the above-mentioned method and system of which a preferred embodiment is described. In these instances and wherever it would be appropriate, a system is provided which uses BLUETOOTH™ modules that is able to monitor small predetermined areas.

Figure 3:
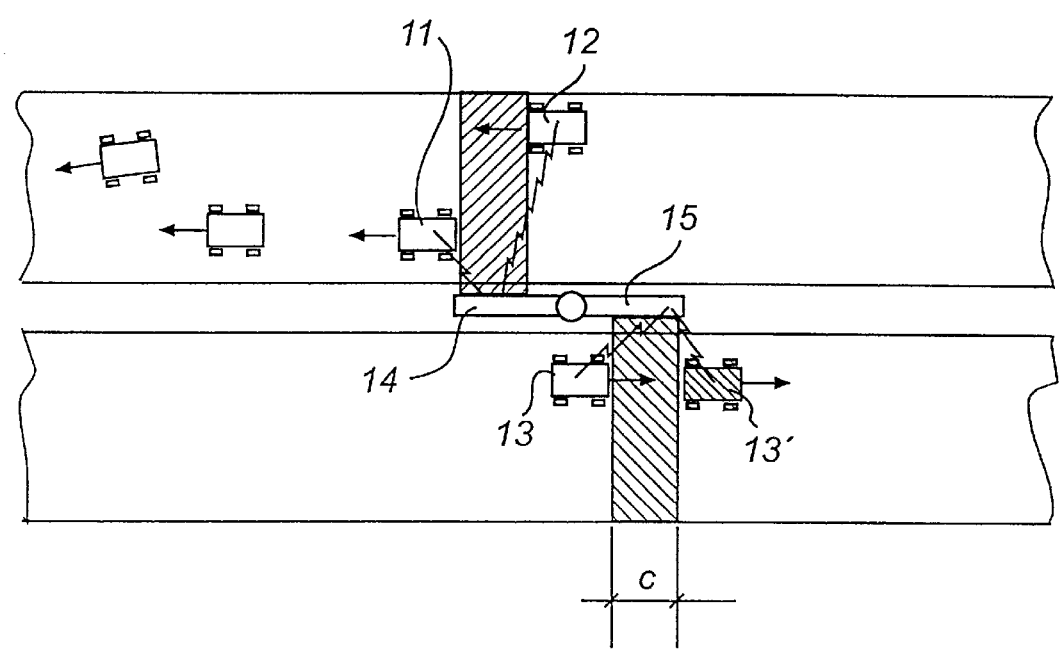
FIG. 3 is a schematic view of a traffic monitoring system using BLUETOOTH™ technology.

Referring to FIG. 3, 14 and 15 are fixed BLUETOOTH™ units used for monitoring vehicles passing on the respective road side. Vehicle 11 is shown when terminating contact with BLUETOOTH™ unit 15 and vehicle 12 is shown initiating contact with BLUETOOTH™ unit 15. Vehicle 13 is shown at times t, (13) and $t_2$ (13'). Then the coverage area where contact will be established is measured to C. The coverage area is preferably rectangular shaped, which could be obtained using a trimmed signal amplifier and/or a directed antenna. Of course, the signal strength varies when moving further away from the antenna. In order to know the positions where contact is possible, threshold values for establishing contact could be calculated. But preferably, the coverage area is determined using drive tests. This will provide enough data to calculate velocity, while the direction and location is known. This is also shown in FIG. 2, wherein the fixed BLUETOOTH™ unit is transceiver 8. BLUETOOTH™ standards have created uniformity in the deployment of such technology on a worldwide scale. The BLUETOOTH™ unit (module) used in this invention typically consists of an RF unit, a RF management unit, a signal amplifier and a buffer. Such unit would be interfaced to a Micro-Linux Server with a simple user based interface and further interfaced with a wireless unit. The unit is provided with a power supply. Each BLUETOOTH™ module is distinguished by a unique identifier code, and as the coverage range of such unit could be trimmed through the signal amplifier or the antenna to provide coverage for a specific geographic area. It would be possible to calculate the speed of a unit mounted in a vehicle (or in a wireless unit located in the vehicle) from the time of initial radio contact to the loss of such contact as related to the time elapsed, shown in FIG. 3. In an alternative embodiment, specific levels of signal strength could be used as threshold triggers. As contact is made with one unit, time elapsed between signal acquisition for a specific unit and signal loss is recorded in the buffer, transferred to the Linux micro server and upstreamed to a Traffic Monitoring Server where speed is be calculated (under certain conditions speed could be calculated directly by the Linux server). Note that because of the precise area coverage trimming possible, direction would not be a relevant issue in this application. As BLUETOOTH™ modules most probably will become a standard in motor vehicles architecture in the near future, such application could prove not to require specific installation of modules on vehicles which would be dedicated to provide data input. The simple process of acknowledgement between BLUETOOTH™ units, built in the standard BLUETOOTH™ architecture could be sufficient for such estimation. In either case this application within the proposed system, could have limited or rather extensive applications. In an alternative embodiment, two or more fixed BLUETOOTH™ units could be used. These would then be located along the road, but with a given distance between them. Then, the time difference between making contact with the first fixed BLUETOOTH™ unit and making contact with the second BLUETOOTH™ unit could be calculated. This time difference and the known spacing between the fixed BLUETOOTH™ units is then sufficient for calculating the velocity of vehicles equipped with BLUETOOTH™ units passing by. Of course, the time difference could based on time being in contact or time between losing contact, etc.

The invention has been described above in terms of preferred embodiments. However, the scope of this invention should not be limited by these embodiments, and alternative embodiments of the invention are feasible, as should be appreciated by a person skilled in the art. For example, the fixed unit described as a BLUETOOTH™ unit and its counterpart located in a vehicle does not necessarily have to be constructed exactly according to the BLUETOOTH™ standards, but have to work according to the same principles. Such embodiments should be considered to be within the scope of the invention, as it is defined by the appended claims.

What is claimed is:

1. A method for traffic monitoring, comprising the steps of:
   determining at least twice, within a specified time interval, geographical positions of a plurality of mobile devices in a mobile telecommunications network by means of measuring at least one property of signals transmitted between said mobile devices and base stations in said mobile telecommunications network;
   comparing at least a subset of said geographical positions with a route of a road provided in a route database in order to identify mobile devices having routes corresponding to at least a part of said road route;
   calculating a velocity for said identified mobile devices based on said at least two positions;
   identifying slow-moving mobile devices having a velocity being below an exclusion velocity limit; and
   comparing said calculated velocity of at least one identified mobile device that is not one of the slow-moving mobile devices with a reference velocity of said road in order to predict traffic intensity on said road.

2. A method according to claim 1, wherein said step of determining positions is network based, and the measuring of signals is performed by means located in the base station.

3. A method according to claim 2, wherein only signals sent from said mobile devices are measured.

4. A method according to claim 1, wherein said step of determining positions is performed centrally.

5. A method according to claim 1, wherein said identified mobile device of which velocity is compared, is the mobile device having the highest velocity.

6. A method according to claim 1, wherein said step of comparing velocity includes the step of comparing velocities of a plurality of identified mobile devices with said reference velocity.

7. A method according to claim 1, wherein said reference velocity is the maximum allowed velocity on said road.

8. A method according to claim 1, wherein said reference velocity is a historical average velocity of said road.

9. A method according to claim 1, further comprising the step of:

presenting a graphical map of road routes having the traffic intensity on a road route represented by colors describing the level of intensity.

10. A method according to claim 1, wherein said route database comprises information about the geographical relationship between road routes an positions of base stations in a mobile telecommunications network.

11. A system for traffic monitoring comprising:

positioning means for determining a least twice, within a specified time interval, geographical positions of a plurality of mobile devices in a mobile telecommunications network by means of measuring at least one property of signals transmitted between said mobile devices and base stations in said mobile telecommunication network;

means for comparing at least a subset of said geographical positions with a route of a road provided in a route database in order to identify mobile devices having routes corresponding to at least a part of said road route;

means for calculating a velocity for said identified mobile devices based on said at least two positions;

means for identifying slow-moving mobile devices having a velocity being below an exclusion velocity limit; and means for comparing said calculate velocity of at least one identified mobile device that is not one of the slow-moving mobile devices with a reference velocity of said road in order to predict traffic intensity on said road.

12. A system for traffic monitoring of a road comprising:

at least one fixed transceiver located near said road having a coverage area covering essentially the full width of said road, being adapted to communicate with a transceiver located in a vehicle moving on said road;

means for measuring the time difference between establishing of contact and loss of contact with a transceiver moving through said coverage area;

means for calculating a velocity of said moving transceiver based on said tire difference and information about said coverage area; and means for comparing a calculated velocity of at least one moving transceiver with a reference velocity of said road in order to predict traffic intensity on said road.

13. A system according to claim 12, wherein said fixed transceiver and said moving transceiver are BLUETOOTH™ units.

14. A system according to claim 12 or 13, wherein said coverage area is a substantially rectangular shaped band substantially perpendicular to the direction of said road, and said band being provided by a directed antenna.

15. A system according to claim 12 or 13, comprising two fixed BLUETOOTH™ units located between the lanes of opposite directions having their antennas directed towards respective roadside.

* * * * *